United States Patent
Azogui et al.

(10) Patent No.: US 9,391,909 B2
(45) Date of Patent: Jul. 12, 2016

(54) APPARATUS, METHOD AND SYSTEM OF RATE ADAPTATION BASED ON GOODPUT

(71) Applicant: Intel Corporation, Santa Clara, CA (US)

(72) Inventors: Tal Azogui, Ganot Hadar (IL); Vallabhajosyula S. Somayazulu, Portland, OR (US); Vered Bar Bracha, Hod Hasharon (IL); Jean-Pierre Giacalone, Sophia-Antipolis (FR)

(73) Assignee: INTEL CORPORATION, Santa Clara, CA (US)

( * ) Notice: Subject to any disclaimer, the term of this patent is extended or adjusted under 35 U.S.C. 154(b) by 61 days.

(21) Appl. No.: 14/188,735

(22) Filed: Feb. 25, 2014

(65) Prior Publication Data
US 2015/0244634 A1   Aug. 27, 2015

(51) Int. Cl.
*H04L 12/26* (2006.01)
*H04L 12/825* (2013.01)

(52) U.S. Cl.
CPC .................................... *H04L 47/263* (2013.01)

(58) Field of Classification Search
None
See application file for complete search history.

(56) References Cited

U.S. PATENT DOCUMENTS

| | | | |
|---|---|---|---|
| 7,295,549 B2 * | 11/2007 | Pepin et al. | 370/352 |
| 9,060,252 B2 * | 6/2015 | Kim et al. | |
| 2014/0348049 A1 | 11/2014 | Kim et al. | |

OTHER PUBLICATIONS

Aggarwal et al, Rate Adaptation via Link-Layer Feedback for Goodput Maximization over a Time-Varying Channel, IEEE, 10 pages, Aug. 2009.*
W3C, WebRTC 1.0: Real-time Communication Between Browsers, W3C Working Draft Sep. 10, 2013, 38 pages.
RTP/RTCP Microsoft Extensions, Bandwidth Estimation, 1 page.
X. Zhu et al., "NADA: A Unified Congestion Control Scheme for Real-Time Media", Network Working Group, draft-zhu-rmcat-nada-00, Oct. 14, 2012, 10 pages.
Cicco et al., "Experimental Investigation of the Google Congestion Control for Real-Time Flows", Aug. 16, 2013, 6 pages.
Hou et al., "Scheduling Heterogeneous Real-Time Traffic over Fading Wireless Channels", INFOCOM, 2010 Proceedings IEEE, 9 pages.
Barzuza et al., "Trend: A Dynamic Bandwidth Estimation and Adaptation Algorithm for Real-Time Video Calling", Proceedings of 2010 IEEE 18th International Packet Video Workshop, Dec. 13-14, 2010, Hong Kong, 8 pages.
Office Action for Taiwanese Patent Application No. 104101497, mailed on Dec. 22, 2015, 8 pages (Including 1 page of English translation).

* cited by examiner

*Primary Examiner* — Frank Duong
(74) *Attorney, Agent, or Firm* — Shichrur & Co.

(57) ABSTRACT

Some demonstrative embodiments include devices, systems and methods of to rate adaptation based on goodput. For example, an apparatus may include a packet selector to select at a first device a plurality of goodput packets from a plurality of received packets from a second device, the packet selector to select the plurality of goodput packets based on at least one selection parameter corresponding to the plurality of received packets; a band calculator to calculate a bit-rate band based on a dispersion of a goodput parameter corresponding to the plurality of goodput packets; and a feedback module to provide a bit-rate adaptation feedback to the second device based on the bit-rate band.

24 Claims, 6 Drawing Sheets

APPARATUS, METHOD AND SYSTEM OF RATE ADAPTATION BASED ON GOODPUT

TECHNICAL FIELD

Embodiments described herein generally relate to rate adaptation based on goodput.

BACKGROUND

Some types of data, for example, digital video data, may be compressed prior to being transmitted via a communication network, e.g., including a wireless channel, from a transmitter, or source, of data, e.g., a video source, to a receiver, or destination, of the data, e.g., a video destination. In general, the greater the compression, the more sensitive the transmission is to losses. For example, a highly compressed digital video will be more sensitive to packet loss than an uncompressed digital video or a lesser-compressed digital video. The effect of packet loss on compressed digital video may result in visible artifacts, e.g., "frozen" frames or blocks, black frames, blurring, ghosting, missing pixels, jerkiness, and the like. Digital video encoded using temporal coding techniques may be more sensitive to losses, for example, due to the fact that decoding a particular frame often requires data from previous, or previous and future, frames. Accordingly, the loss of a single packet may result in visible artifacts beyond a single frame. In extreme cases, all frames that rely on a lost packet may be "frozen", e.g., until a complete refresh frame is received.

Video rate adaptation may be implemented to adapt a video-encoding rate to account for the packet loss and/or for network congestion. In video rate adaption, it may be imperative to react quickly to network congestion, e.g., to avoid packet loss, which may result in a long video freeze due to the predictive nature of video compression.

Implementing a "pessimistic approach", which does not recover fast from a congestion event will result in not utilizing a full capacity of the network, which, in turn, may result in poor video quality due to compression artifacts.

Delay-based rate-adaptation algorithms may use end-to-end (e2e) delay measurements of sets of successive packets or video frames to provide a warning of impending congestion and packet drops. For example, explicit Real-time Transport Control Protocol (RTCP) probe pair packets may be used for initial or repeated bandwidth estimations.

However, existing delay based congestion detection heuristics fail to provide an accurate and reliable bit rate adaptation, e.g., in highly dynamic network conditions. The existing delay-based rate adaptation algorithms are prone to unpredictable behavior and/or exhibit poor fairness, for example, when required to fairly share a bottleneck bandwidth with concurrent flows.

For example, some rate adaptation algorithms, which are configured to operate with a maximum rate constraint or a delta rate constraint, may be blind to network instability, and may result in delay fluctuations, for example, when uncoordinated multi-flows operate on the same network. Other rate adaptation algorithms may utilize state driven mechanisms, which may be configured to mitigate unstable behavior by attempting to predict network conditions in a finite state machine. Such state-driven mechanisms may be cumbersome and/or fail to converge. In practice, a resulting flow rate of such mechanisms tends to toggle between flow starvation, i.e., underutilization of network capacity, and flow rate "swings", both having significant impact on perceived video quality.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
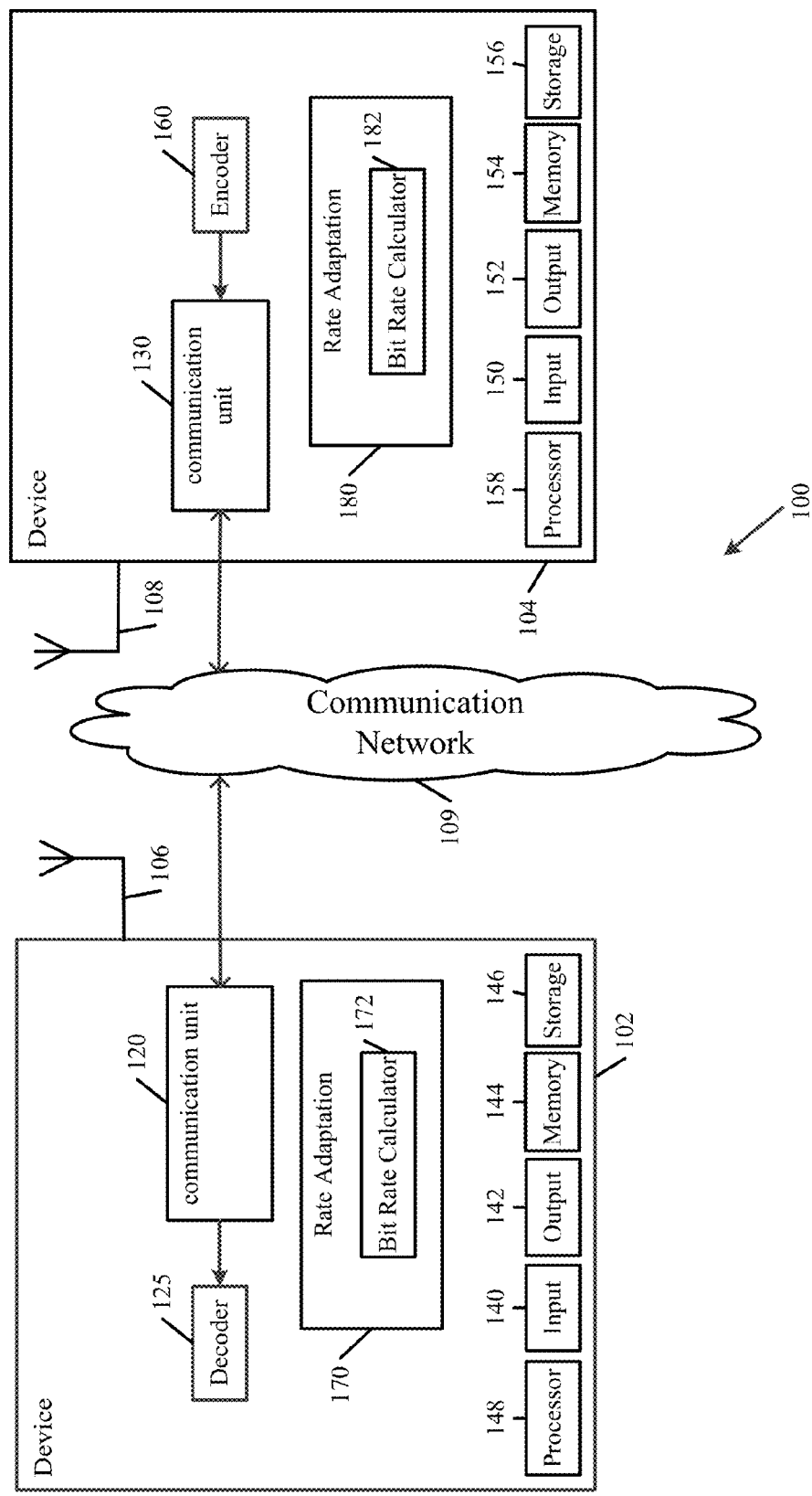
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a communication system, a communication device, a wireless communication system, a wireless communication device, a wired communication device, a wired communication system, a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Web Real-Time Communication standards (*WebRTC* 1.0: *Real-time Communication Between Browsers, W3C Working Draft* 10 *Sep.* 2013) and/or future versions and/or derivatives thereof, IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; *IEEE*802.11 *task group ac (TGac) ("IEEE*802.11-09/0308*r*12—*TGac Channel Model Addendum Document"*); IEEE 802.11 *task group ad (TGad)* (*IEEE P*802.11*ad-*2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band,* 28 *Dec.* 2012)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, Final specification) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other wired and/or wireless devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communication device", as used herein, includes, for example, a device capable of wireless and/or wired communication, a communication device capable of wireless and/or wired communication, a communication station capable of wireless and/or wired communication, a portable or non-portable device capable of wireless and/or wired communication, or the like. In some demonstrative embodiments, a communication device may be or may include a peripheral that is integrated with a computer, or a peripheral that is attached to a computer.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to rate adaptation of encoding video data.

Some demonstrative embodiments are described herein with respect to rate adaptation of encoding video data in real time.

Some demonstrative embodiments are described herein with respect to rate adaptation of encoding video data of a simultaneous two-way communication.

Some demonstrative embodiments are described herein with respect to rate adaptation of encoding video data of a video teleconference call.

Other embodiments may include rate adaptation of any other video data and/or any other non-video data, e.g., audio data, graphic data, and the like.

Reference is now made to FIG. 1, which schematically illustrates a block diagram of a system 100, in accordance with some demonstrative embodiments.

In some demonstrative embodiments, system 100 may include one or more devices, e.g., devices 102 and 104, capable of communicating over at least one communication network 109.

In some demonstrative embodiments, devices 102 and/or 104 may include communication units 120 and/or 130, respectively, to perform communication between wireless communication devices 102 and/or 104 and/or with one or more other devices, e.g., as described below.

In some demonstrative embodiments, communication network 109 may include one or more wireless communication networks, one or more wired communication networks, and/or any combination of one or more wireless communication networks and/or one or more wired communication networks, e.g., as described below.

In some demonstrative embodiments, device 102 may include a wireless communication device capable of communicating content, data, information and/or signals over a wireless communication medium, for example, a radio channel, an IR channel, a RF channel, a Wireless Fidelity (WiFi) channel, and the like. For example, communication unit 120 may include a wireless communication unit. The wireless communication unit may include at least one radio including, for example, one or more wireless transmitters, receivers and/or transceivers able to send and/or receive wireless communication signals, RF signals, frames, blocks, transmission streams, packets, messages, data items, and/or data.

In some demonstrative embodiments, device 104 may include a wireless communication device capable of communicating content, data, information and/or signals over a wireless communication medium, for example, a radio channel, an IR channel, a RF channel, a Wireless Fidelity (WiFi) channel, and the like. For example, communication unit 130 may include a wireless communication unit. The wireless communication unit may include at least one radio including, for example, one or more wireless transmitters, receivers and/or transceivers able to send and/or receive wireless communication signals, RF signals, frames, blocks, transmission streams, packets, messages, data items, and/or data.

In some demonstrative embodiments, communication units 120 and/or 130 may include or may be implemented as part of a wireless Network Interface Card (NIC), and the like.

In some demonstrative embodiments, devices 102 and 104 may include, or may be associated with, one or more antennas 106 and 108, respectively. Antennas 106 and/or 108 may include any type of antennas suitable for transmitting and/or receiving wireless communication signals, blocks, frames, transmission streams, packets, messages and/or data, e.g., over wireless medium 110. For example, antennas 106 and/or 108 may include any suitable configuration, structure and/or arrangement of one or more antenna elements, components, units, assemblies and/or arrays. Antennas 106 and/or 108 may include an antenna covered by a quasi-omni antenna pattern. For example, antennas 106 and/or 108 may include at least one of a phased array antenna, a single element antenna, a set of switched beam antennas, and the like. In some embodiments, antennas 106 and/or 108 may implement transmit and receive functionalities using separate transmit and receive antenna elements. In some embodiments, antennas 106 and/or 108 may implement transmit and receive functionalities using common and/or integrated transmit/receive elements.

In other embodiments, device 102 may include a wired communication device capable of communicating over a wired communication medium, and/or device 104 may include a wired communication device capable of communicating over a wired communication medium. For example, communication unit 120 and/or communication unit 130 may include a wired communication unit, for example, a modulator-demodulator (modem) capable of sending and/or receiving communication signals, frames, blocks, transmission streams, packets, messages, data items, and/or data, over one or more wired links.

In some demonstrative embodiments, device 102 and/or device 104 may include or may be implemented as part of a mobile or portable device. For example, device 102 and/or device 104 may include or may be implemented as part of a mobile computer, a laptop computer, an Ultrabook™ computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

In some demonstrative embodiments, device 102 and/or device 104 may include or may be implemented as part of a stationary device. For example, device 102 and/or device 104 may include or may be implemented as part of a stationary computer, a PC, a server computer, a stationary video player or recorder, a television, a display, and the like.

In some demonstrative embodiments, device 102 may include, for example, one or more of a processor 148, an input unit 140, an output unit 142, a memory unit 144, and a storage unit 146, and/or device 104 may include, for example, one or more of a processor 158, an input unit 150, an output unit 152, a memory unit 154, and a storage unit 156. Devices 102 and/or 104 may optionally include other suitable hardware components and/or software components. In some demonstrative embodiments, some or all of the components of one or more of devices 102 and/or 104 may be enclosed in a common housing or packaging, and may be interconnected or operably associated using one or more wired or wireless links. In other embodiments, components of one or more of devices 102 and/or 104 may be distributed among multiple or separate devices.

Processor 148 and/or processor 158 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 148 executes instructions, for example, of an Operating System (OS) of device 102 and/or of one or more suitable applications. Processor 158 executes instructions, for example, of an Operating System (OS) of device 104 and/or of one or more suitable applications.

Input unit 140 and/or input unit 150 includes, for example, a keyboard, a keypad, a mouse, a touch-screen, a touch-pad, a track-ball, a stylus, a microphone, or other suitable pointing device or input device. Output unit 142 and/or output unit 152 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 144 and/or memory unit 154 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 146 and/or storage unit 156 includes, for example, a hard disk drive, a floppy disk drive, a Compact Disk (CD) drive, a CD-ROM drive, a DVD drive, or other suitable removable or non-removable storage units. Memory unit 144 and/or storage unit 146, for example, may store data processed by device 102. Memory unit 154 and/or storage unit 156, for example, may store data processed by device 104.

In some demonstrative embodiments, device 104 may include an encoder 160 to encode data to be transmitted by device 104, e.g., to device 102. For example, encoder 160 may include a video encoder. In other embodiments, encoder 160 may include any other encoder to encode any other type of data, e.g., audio data, and the like.

In some demonstrative embodiments, device 102 may include a decoder 125 to decode encoded data received at device 102. For example, decoder 125 may include a video decoder to decode the encoded video encoded by encoder 160.

In some demonstrative embodiments, an available bandwidth for communicating the data, e.g., the video data, between device 104 and device 102 may vary, for example, based on variations in congestion and/or other conditions of the communication network 109, e.g., as described below.

Figure 2:
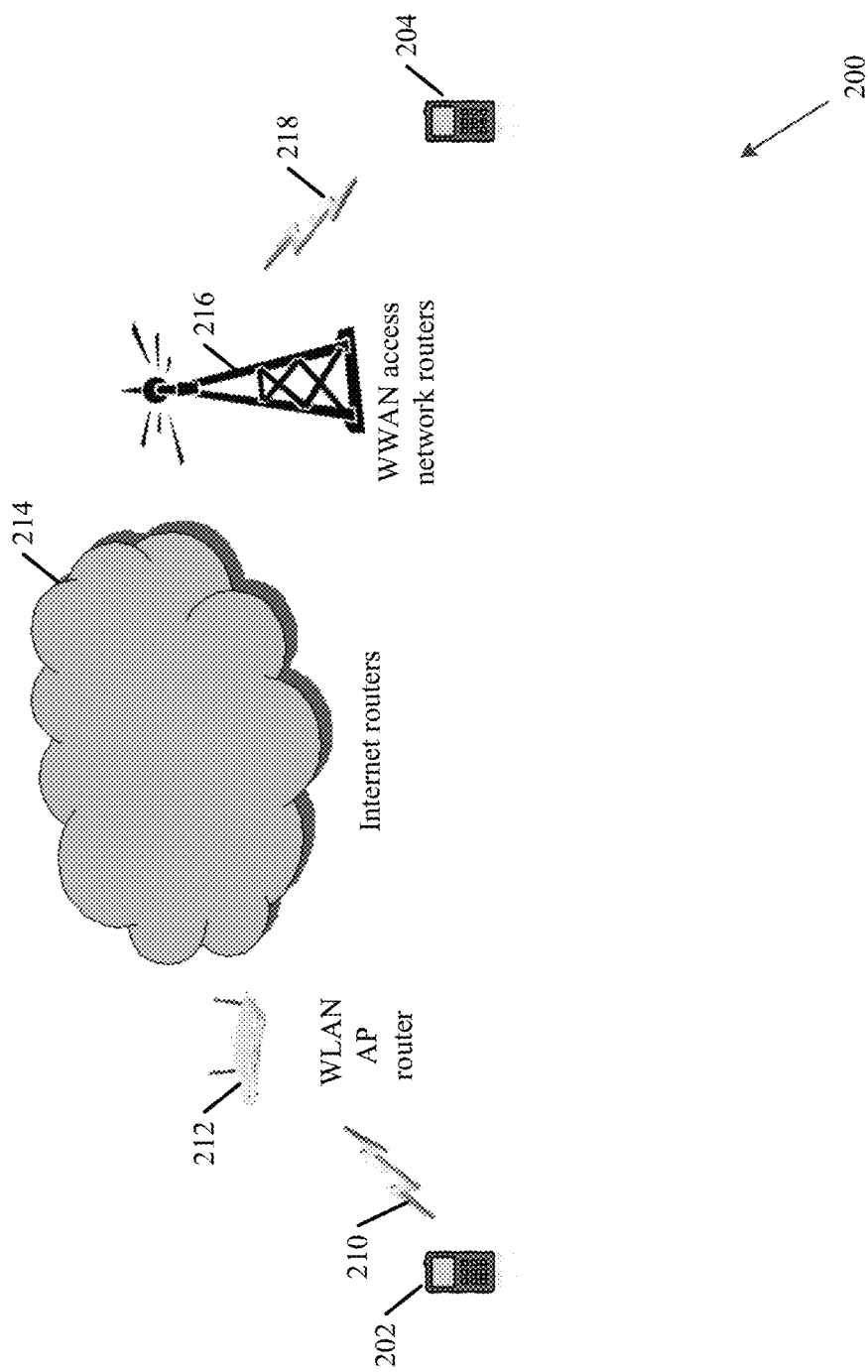
FIG. 2 is a schematic block diagram illustration of a deployment of first and second mobile devices engaged in two-way communication, in accordance with some demonstrative embodiments.

Reference is made to FIG. 2, which schematically illustrates a deployment 200 of a first mobile device 202 ("Client A") and second mobile device ("Client B") engaged in two-way communication, in accordance with some demonstrative embodiments. For example, mobile device 202 may perform the functionality of device 104 (FIG. 1) and/or mobile device 204 may perform the functionality of device 102 (FIG. 1).

As shown in FIG. 2, in some demonstrative embodiments mobile device 202 may communicate with a WLAN router 212 via a WLAN link 210, e.g., a WiFi link, and mobile device 204 may communicate with a WWAN node 216, e.g., including one or more access network routers, via a WWAN link 218, e.g., a cellular link.

In some demonstrative embodiments, WLAN router 212 may communicate with WWAN router 216 via a communication infrastructure 214, e.g., including a plurality of Internet routers.

In some demonstrative embodiments, mobile devices 202 and 204 may exchange video data. For example, a video conferencing call may be set up between mobile devices 202 and 204.

In some demonstrative embodiments, the video conferencing call may be set up using a negotiated video bit rate, which may be determined, for example, based on conditions of links 210, 218 and/or infrastructure 214, when setting up the video conference call. For example, encoder 160 (FIG. 1) may encode video data of the video conference call according to the negotiated video bit rate.

In some demonstrative embodiments, an available bandwidth for communicating the video data between mobile devices 202 and 204 may vary, for example, based on variations in congestion and/or other conditions of the communication network between mobile devices 202 and 204.

In some demonstrative embodiments, an actual available video bit rate for communicating the video data between mobile devices 202 and 204 may vary dynamically, for example, based on the variations in the available bandwidth.

In one example, the available bit rate of video encoded by mobile device 202 may vary as a result of residual wireless link errors in an uplink from mobile device 202 to WLAN router 212, for example, after a Media-Access-Control (MAC) retransmission (re-TX) limit is reached, e.g., due to fading and/or interference bursts.

Additionally or alternatively, the available bit rate of the video encoded by mobile device 202 may vary as a result of congestion in the WLAN uplink from mobile device 202 to WLAN router 212. The Congestion in the WLAN uplink may result, for example, in delays building up at mobile device 202. For example, a MAC layer behavior of WLAN router 212, e.g., an aggregation scheme employed by WLAN router 212, may affect the delay at mobile device 204.

Additionally or alternatively, the available bit rate of the video encoded by mobile device 202 may vary as a result of congestion in infrastructure 214. For example, Internet router queues of infrastructure 214 may begin to back up, thereby increasing delays. Eventually, overloaded tail drop queues may lead to blocks of packets being dropped within infrastructure 214.

Additionally or alternatively, the available bit rate of the video encoded by mobile device 202 may vary as a result of congestion in a wireless access network downlink to mobile device 204. For example, although some residual wireless link errors may be captured in a Real-time Transport Control Protocol (RTCP) loss report, an available bandwidth of link 218 may change, e.g., due to link adaptation and the like, and/or queues in a radio resource allocation at node 216 may introduce varying delay. Delays may start to increase, for example, if there is a mismatch between video bit rate and available bandwidth. In addition, other delays can occur as a result of operations by node 216, for example, as a result of handoffs, and/or switching of mobile device 204 to a different gateway.

In one example, the available bit rate of video encoded by mobile device 204 may vary as a result of congestion in a wireless access network uplink from mobile device 204 to node 216. The Congestion in the wireless access network uplink may result, for example, in delays building up at mobile device 204.

Additionally or alternatively, the available bit rate of the video encoded by mobile device 204 may vary as a result of congestion in infrastructure 214. For example, Internet router queues of infrastructure 214 may begin to back up, thereby increasing delays. Eventually, overloaded tail drop queues may lead to blocks of packets being dropped within infrastructure 214.

Additionally or alternatively, the available bit rate of the video encoded by mobile device 204 may vary as a result of congestion in a WLAN downlink to mobile device 202.

Referring back to FIG. 1, in some demonstrative embodiments, devices 102 and/or 104 may be configured to implement a goodput-based rate adaptation to adapt the rate of the encoded data, e.g., the encoded video data, communicated between device 102 and 104, e.g., as described below.

In some demonstrative embodiments, the goodput-based rate adaptation may be configured to increase, e.g., maximize, a percentage of packets, which are delivered between devices 102 and 104 within a-priori set delay bounds.

In some demonstrative embodiments, increasing, e.g., maximizing, the percentage of packets being delivered between device 102 and 104 may increase, e.g., maximize video Quality of Experience (QoE) performance.

In some demonstrative embodiments, at least one of devices 102 and 104 may include a rate adaptation module, for example, device 102 may include a rate adaptation module 170 and/or device 104 may include a rate adaptation module 180, e.g., as described below.

In some demonstrative embodiments, rate adaptation module 170 may be configured to determine a bit-rate adaptation feedback based on packets of encoded data received from device 104. For example, rate adaptation module 170 may be configured to determine a bit-rate adaptation feedback based on a one-way transit delay, e.g., an end-to-end (e2e) delay, of the packets received by device 102, e.g., as described below.

In some demonstrative embodiments, device 102 may feedback the bit-rate adaptation feedback to device 104, and device 104 may adapt the bit-rate of the encoded data based on the bit-rate adaptation feedback, e.g., as described below.

In some demonstrative embodiments, rate adaptation module 170 may be configured to provide the bit-rate adaptation feedback in the form of an adapted bit-rate, e.g., as described below. For example, rate adaptation module 170 may include a bit-rate calculator 172 to calculate the adapted bit-rate. Device 104 may adapt the bit-rate of the encoded data according to the adapted bit-rate received from device 102. According to these embodiments, the adapted bit-rate received from device 102 may be fed directly to encoder 160, e.g., without requiring any processing of rate adaptation module 180 at device 104.

In some demonstrative embodiments, rate adaptation module 170 may be configured to provide the bit-rate adaptation feedback in the form of a bit-rate band, e.g., as described below. Device 104 may receive the bit-rate band and may calculate the adapted bit-rate based on the bit-rate band. For example, device 104 may include a bit-rate calculator 182 to calculate the adapted bit-rate, e.g., as described below.

In some demonstrative embodiments, rate adaptation module 180 may be configured to determine an adapted bit-rate based on packets of encoded data transmitted from device 104, e.g., as described below. For example, rate adaptation module 180 may be configured to determine a bit-rate adaptation feedback based on a delay, e.g., a round trip delay (RTD) or any other delay, of the packets transmitted from device 104 to device 102 and acknowledgements received from device 102 at device 104, e.g., as described below. For example, device 104 may receive from device 102 feedback including the delay of the packets transmitted from device 104 to device 102 and/or device 104 may determine the RTD based on a timing of acknowledgements received from device 102.

In some demonstrative embodiments, device 104 may adapt the bit-rate of the encoded data based on the adapted bit-rate. For example, rate adaptation module 180 may include a bit-rate calculator 182 to calculate the adapted bit-rate. According to these embodiments, it may not be required to implement rate adaptation module 170 at device 102 with respect to the packets transmitted from device 104 to device 102.

Figure 3:
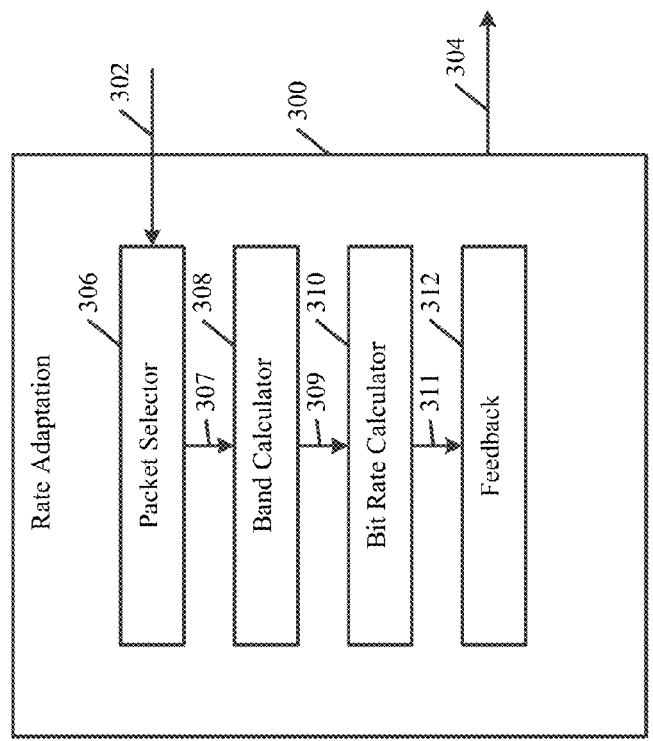
FIG. 3 is a schematic block diagram illustration of a rate adaptation module, in accordance with some demonstrative embodiments.

Reference is made to FIG. 3, which schematically illustrates a rate adaptation module 300, in accordance with some demonstrative embodiments. In some demonstrative embodiments, rate adaptation module 300 may perform the functionality of rate adaptation module 170 (FIG. 1). In some demonstrative embodiments, rate adaptation module 300 may perform the functionality of rate adaptation module 180 (FIG. 1).

In some demonstrative embodiments, rate adaptation module 300 may determine a bit-rate adaptation output 304 based on an input 302 corresponding to a plurality of communicated packets, e.g., as described below.

In some demonstrative embodiments, input 302 may correspond to a plurality of received packets, and output 304 may include feedback to be provided to a transmitter of the packets.

For example, rate adaptation module 300 may perform the functionality of rate adaptation module 170 (FIG. 1). According to this example, input 302 may correspond to a plurality of packets received at device 102 (FIG. 1), e.g., from device 104 (FIG. 1), and output 304 may include feedback to be provided to device 104 (FIG. 1), e.g., as described above.

In some demonstrative embodiments, input 302 may correspond to a plurality of transmitted packets, and output 304 may include an adapted bit-rate to be provided to an encoder.

For example, rate adaptation module 300 may perform the functionality of rate adaptation module 180 (FIG. 1). According to this example, input 302 may correspond to a plurality of packets transmitted from device 104 (FIG. 1), e.g., to device 102 (FIG. 1), and output 304 may include an adapted bit-rate to be provided to encoder 160 (FIG. 1), e.g., as described above.

In some demonstrative embodiments, input 302 may include for a communicated packet, for example, at least a size of the communicated packet and a time corresponding to the communicated packet, e.g., a time stamp.

In some demonstrative embodiments, rate adaptation module 300 may be configured to perform multi-stage bandwidth estimation using goodput packets, e.g., as described below.

In some demonstrative embodiments, rate adaptation module 300 may be configured to perform a coarse estimation by determining a bit-rate band based on a dispersion, e.g., a variance, of the goodput packets, as described below.

In some demonstrative embodiments, rate adaptation module 300 may be configured to perform a fine estimation within the bit-rate band, for example, according to an actual packet delay, e.g., as described below.

In some demonstrative embodiments, rate adaptation module 300 may include a packet selector 306 to select a plurality of goodput packets 307 from the plurality of communicated packets, based on at least one selection parameter corresponding to the communicated packets, e.g., as described below.

In some demonstrative embodiments, the selection parameter may depend on or may represent network congestion between devices communicating the communicated packets. For example, the selection parameter may depend on network congestion between devices 102 (FIG. 1) and 104 (FIG. 1).

In some demonstrative embodiments, packet selector 306 may select the plurality of goodput packets 307 based on a threshold of the selection parameter. The threshold may be configured to represent an acceptable, e.g., a maximum acceptable, delay for communication of the packets, e.g., real-time communication of the packets. In other embodiments, packet selector 306 may select the plurality of goodput packets 307 based on a plurality of thresholds and/or based on any other criterion applied to one or more selection parameters.

In some demonstrative embodiments, the selection parameter may include a delay parameter, e.g., as described below.

In some demonstrative embodiments, packet selector 306 may select the plurality of goodput packets 307 based on a comparison between packet delays of the plurality of communicated packets and a packet delay threshold.

For example, packet selector 306 may select the plurality of goodput packets 307 to include communicated packets having a packet delay less than the delay threshold.

In some demonstrative embodiments, packet selector 306 may select the plurality of goodput packets 307 based on a comparison between video frame delays corresponding to the plurality of communicated packets and a frame delay threshold.

For example, packet selector 306 may select the plurality of goodput packets 307 to include communicated packets resulting in a video frame delay less than the frame delay threshold. The frame delay may be determined according to any frame-delay calculation and/or algorithm. In one example, packet selector 306 may select the plurality of goodput packets 307 to include a communicated packet, for example, if a frame delay of a frame including the communicated packet is less than the predefined video frame delay.

In some demonstrative embodiments, the selection parameter may include a quality parameter, e.g., as described below.

In some demonstrative embodiments, packet selector 306 may select the plurality of goodput packets 307 based on a comparison between a quality of data in the plurality of communicated packets and a quality threshold.

For example, packet selector 306 may select the plurality of goodput packets 307 to include communicated packets resulting in a video quality greater than the quality threshold. The quality parameter may include any parameter related to a quality of video resulting from the communicated packets, for example, a QoE parameter, and the like.

In some demonstrative embodiments, packet selector 306 may select the plurality of goodput packets 307 based on a combination of one or more delay and/or quality selection parameters.

In some demonstrative embodiments, packet selector 306 may select the plurality of goodput packets 307 based on any other additional or alternative selection parameter.

In some demonstrative embodiments, rate adaptation module 300 may be configured to estimate a goodput parameter corresponding to the plurality of goodput packets 307, and to use the estimated goodput parameter to determine rate constraints, which may be used in a delay based rate adaptation, e.g., as described below.

In some demonstrative embodiments, rate adaptation module 300 may include a band calculator 308 to calculate a bit-rate band 309 based on a dispersion of a goodput parameter corresponding to the plurality of goodput packets 307, e.g., as described below.

In some demonstrative embodiments, the goodput parameter may include, for example, a goodput delivery ratio of goodput packets 307, e.g., as described below.

In one example, the goodput delivery ratio of goodput packets 307 may be determined, for example, as a ratio between a delivered amount of information delivered by goodput packets 307, and a total delivery time of goodput packets 307.

In one example, the goodput delivery ratio may be measured at an application layer, for example, using Real-time Transport Protocol (RTP) packets and an application layer latency boundary.

In other embodiments, the goodput parameter may include any other parameter and/or may be measured in any other manner.

In some demonstrative embodiments, band calculator 308 may calculate bit-rate band 309 based on a variance of the goodput parameter, e.g., as described below.

In other embodiments, band calculator 308 may calculate bit-rate band 309 based on any other dispersion-related attribute, e.g., including any parameter related to a variability, a scatter, and/or spread of the goodput parameter.

In some demonstrative embodiments, the bit-rate band 309 may be configured to represent an actual delay and/or an actual packet loss level corresponding to the communicated packets. For example, if network 109 (FIG. 1) is approaching congestion, a target videoconferencing flow between devices 102 (FIG. 1) and 104 (FIG. 1) may experience both increasing delays as well as packet losses, which may be reflected by the goodput parameter.

In some demonstrative embodiments, rate adaptation module 300 may include a bit-rate calculator 310 to calculate an adapted bit rate 311 based on the bit-rate band 309, e.g., as described below.

In some demonstrative embodiments, bit-rate calculator 310 may determine the adapted bit-rate 311 based on a packet delay of a communicated packet and the bit-rate band 309, e.g., as described below.

In some demonstrative embodiments, the adapted bit-rate 311 may include an adapted bit-rate to be applied to encode a subsequent communicated packet. For example, the adapted bit-rate 311 calculated based on a communicated packet, which is communicated between devices 102 (FIG. 1) and 104 (FIG. 1), may include a bit-rate to be used by encoder 160 (FIG. 1) to encode a subsequent packet to be communicated between devices 102 (FIG. 1) and 104 (FIG. 1), e.g., as described below.

In some demonstrative embodiments, bit-rate calculator 310 may determine a bit-rate adaptation coefficient based on the packet delay of the communicated packet, and bit-rate calculator 310 may determine the adapted bit-rate 311 based on the bit-rate adaptation coefficient and the bit-rate band 309, e.g., as described below.

In some demonstrative embodiments, bit-rate calculator 310 may select the bit-rate adaptation coefficient from a plurality of predefined bit-rate adaptation coefficients based on the packet delay of the communicated packet, e.g., as described below. For example, bit-rate calculator 310 may select the bit-rate adaptation coefficient from a Look Up Table (LUT). In other embodiments, bit-rate calculator 310 may select the bit-rate adaptation coefficient based on any other criterion.

In some demonstrative embodiments, rate adaptation module 300 may include a feedback module 312 to provide output 304 including a bit-rate adaptation feedback based on bit-rate band 309, e.g., as described below.

In one example, rate adaptation module 300 may perform the functionality of rate adaptation module 170 (FIG. 1). According to this example, feedback module 312 may provide output 304 including a bit-rate adaptation feedback to be sent to device 104 (FIG. 1), e.g., to adapt a bit-rate of encoder 160 (FIG. 1).

In some demonstrative embodiments, feedback module 312 may be configured to provide output 304 including adapted bit rate 311. For example, the adapted bit-rate 311 may be configured to be provided directly to encoder 160 (FIG. 1), e.g., if device 104 (FIG. 1) does not include rate adaptation module 180 (FIG. 1) and/or bit rate calculator 182 (FIG. 1).

In other embodiments, feedback module 312 may be configured to provide output 304 including bit-rate band 309. For example, device 104 (FIG. 1) may include bit rate calculator 182 (FIG. 1) to determine the adapted bit rate based on bit-rate band 309. In one example, bit rate calculator 182 (FIG. 1) may perform the functionality of bit rate calculator 310, as described above. According to these embodiments, rate adaptation module 170 (FIG. 1) may perform the functionality of packet selector 306, band calculator 308 and feedback module 312, while rate adaptation module 170 (FIG. 1) may not be required to perform the functionality of bit rate calculator 310.

In another example, rate adaptation module 300 may perform the functionality of rate adaptation module 180 (FIG. 1). According to this example, feedback module 312 may provide output 304 including adapted bit rate 311 to adapt a bit-rate of encoder 160 (FIG. 1). According to this example, bit rate calculator 182 (FIG. 1) may perform the functionality of bit rate calculator 310, as described above. According to this example, rate adaptation module 180 (FIG. 1) may perform the functionality of packet selector 306, band calculator 308, and bit rate calculator 310, while rate adaptation module 180 (FIG. 1) may not be required to perform the functionality of feedback module 312.

In some demonstrative embodiments, determining the adapted bit-rate 311 based on the bit-rate band 309 may be implemented to improve, e.g., optimize, a video QoE delivered to a user of device 102 (FIG. 1).

For example, rate adaptation module 300 may be configured to determine the adapted bit-rate 311, which may offers, for example, a good, e.g., optimized, compromise between high bit rate and low packet loss rate and/or which may optimize any other criteria.

In some demonstrative embodiments, rate adaptation module 300 may enable determining the adapted bit-rate 311 in a manner, which may mitigate the problem of flow starvation or flow rate swings. For example, mapping a calculated one-way transit delay into bit-rate band 309, may yield the adapted bit rate 311 in a manner, which may represent a suggested maximum bit rate for the encoder 160 (FIG. 1).

In some demonstrative embodiments, rate adaptation module 300 may provide an accurate and reliable bit rate adaptation, e.g., in highly dynamic network conditions.

In one example, rate adaptation module 300 may be capable of efficiently handling situations, for example, self-imposed congestion propagation, e.g., while the transmitter and receiver perform and react to bandwidth recommendations.

In some demonstrative embodiments, rate adaptation module 300 may exhibit an increased level of fairness, for example, when required to fairly share a bottleneck bandwidth with concurrent flows.

Figure 4:
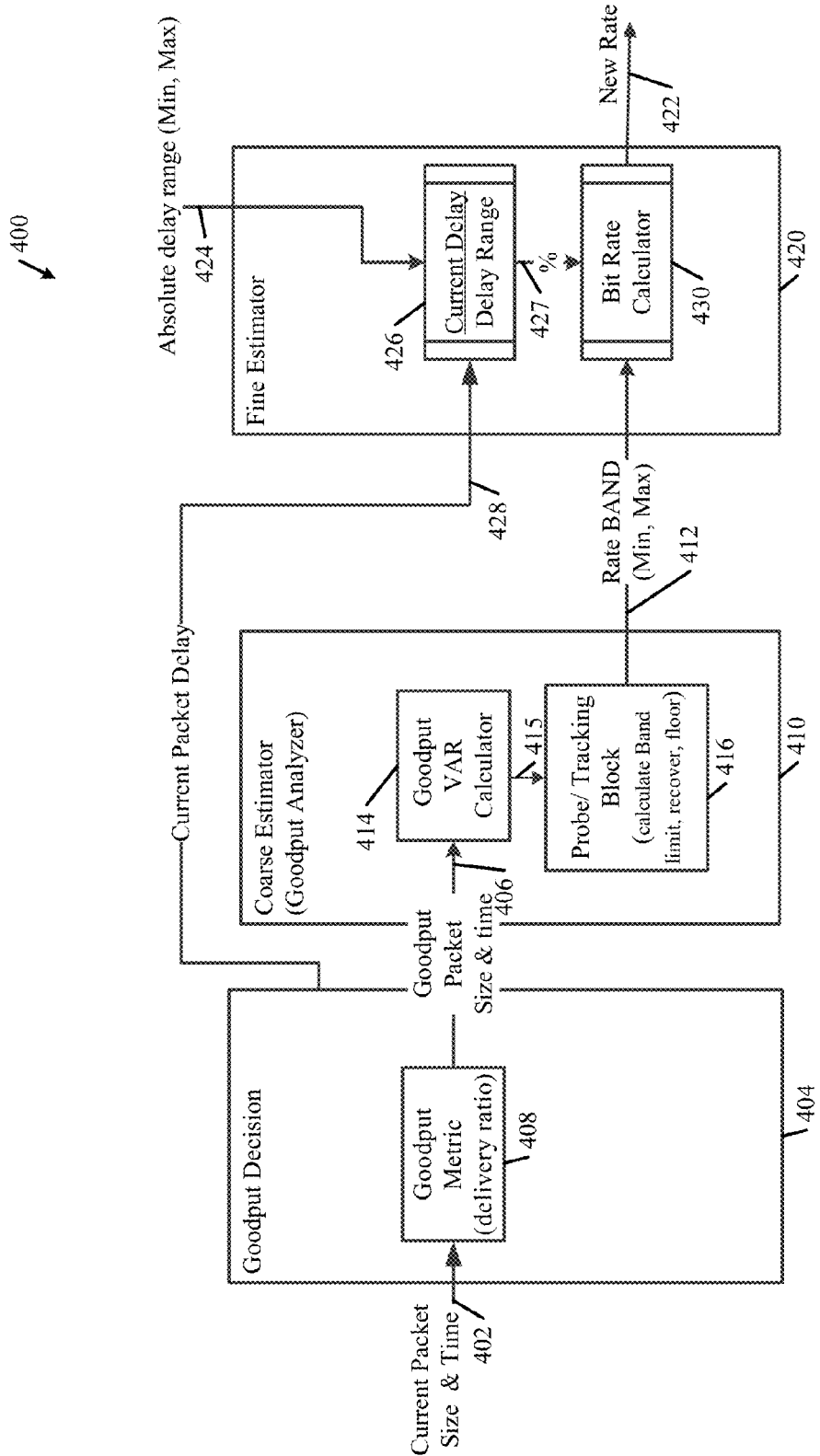
FIG. 4 is a schematic block diagram illustration of a rate adaptation module, in accordance with some demonstrative embodiments.

Reference is made to FIG. 4, which schematically illustrates a rate adaptation module 400, in accordance with some demonstrative embodiments. In some demonstrative embodiments, rate adaptation module 400 may perform the functionality of rate adaptation module 300 (FIG. 3).

In some demonstrative embodiments, rate adaptation module 400 may include a goodput decision module 404 to select a plurality of goodput packets 406 from a plurality of communicated packets 402 according to a goodput metric 408.

For example, goodput metric 408 may include a goodput threshold, which may be configured to represent a maximum acceptable delay, for example, for real-time communication, e.g., as described above. In one example, goodput decision module 404 may perform the functionality of packet selector 306 (FIG. 3), e.g., as described above.

In some demonstrative embodiments, goodput decision module 404 may receive the size and time of a current packet 402 and may select whether to include the current packet in goodput packets 406 based on the goodput metric 408, e.g., as described above.

In some demonstrative embodiments, rate adaptation module 400 may include a coarse estimator (also referred to as "goodput analyzer") 410 to estimate a current network bit-rate band 412 based on the goodput packets 406. For example, coarse estimator 410 may perform the functionality of band calculator 308 (FIG. 3).

In some demonstrative embodiments, coarse estimator 410 may include a goodput variance calculator 414 to calculate a variance 415 of a goodput parameter of the goodput packets 406. For example, goodput variance calculator 414 may calculate a variance of the goodput delivery rate of goodput packets 406, e.g., as described below.

In some demonstrative embodiments, coarse estimator 410 may include a probe/tracking block 416 to determine the current network bit-rate band 412 based on the variance 415, e.g., as described below.

In some demonstrative embodiments, goodput decision module 404 and coarse estimation module 410 may be implemented as separate elements of rate adaptation module 400, e.g., as shown in FIG. 4. In other embodiments, goodput decision module 404 may be implemented as part of coarse estimation module 410, e.g., as described below with reference to FIG. 5.

In some demonstrative embodiments, rate adaptation module 400 may include a fine estimator 420 to determine an adapted bit-rate ("new rate") 422 based on the bit-rate band 412 and a current packet delay 428 of the current packet 402. For example, fine estimator 420 may perform the functionality of bit rate calculator 310 (FIG. 3).

In some demonstrative embodiments, fine estimator 420 may determine the adapted bit-rate 420 by mapping the current packet delay 428 according to a defined delay range 424. For example, delay range 424 may be defined by an application, e.g., a video application, to utilize the video data of the packets 402. In one example, delay range 424 may define an absolute delay range, e.g., between a minimal delay and a maximal delay, which may be allowed for the video data.

In some demonstrative embodiments, fine estimator 420 may include a mapper 426 to map the current packet delay 428 with respect to the delay range 424.

In one example, mapper 426 may determine a percentile 427 by determining a rate ratio between the current packet delay 428 and the delay range 424, e.g., as described below.

In some demonstrative embodiments, fine estimator 420 may include a bit-rate calculator 430 to calculate adapted bit-rate 422 based on the percentile 427 and the bit-rate band 412.

In some demonstrative embodiments, bit-rate calculator 430 may be configured to perform a fine adjustment of the bit-rate 422, e.g., up to a network capacity temporal maximum without imposing network swings.

In one example, bit-rate calculator 430 may calculate adapted bit-rate 422 by multiplying percentile 427 with bit-rate band 412, e.g., as described below.

Figure 5:
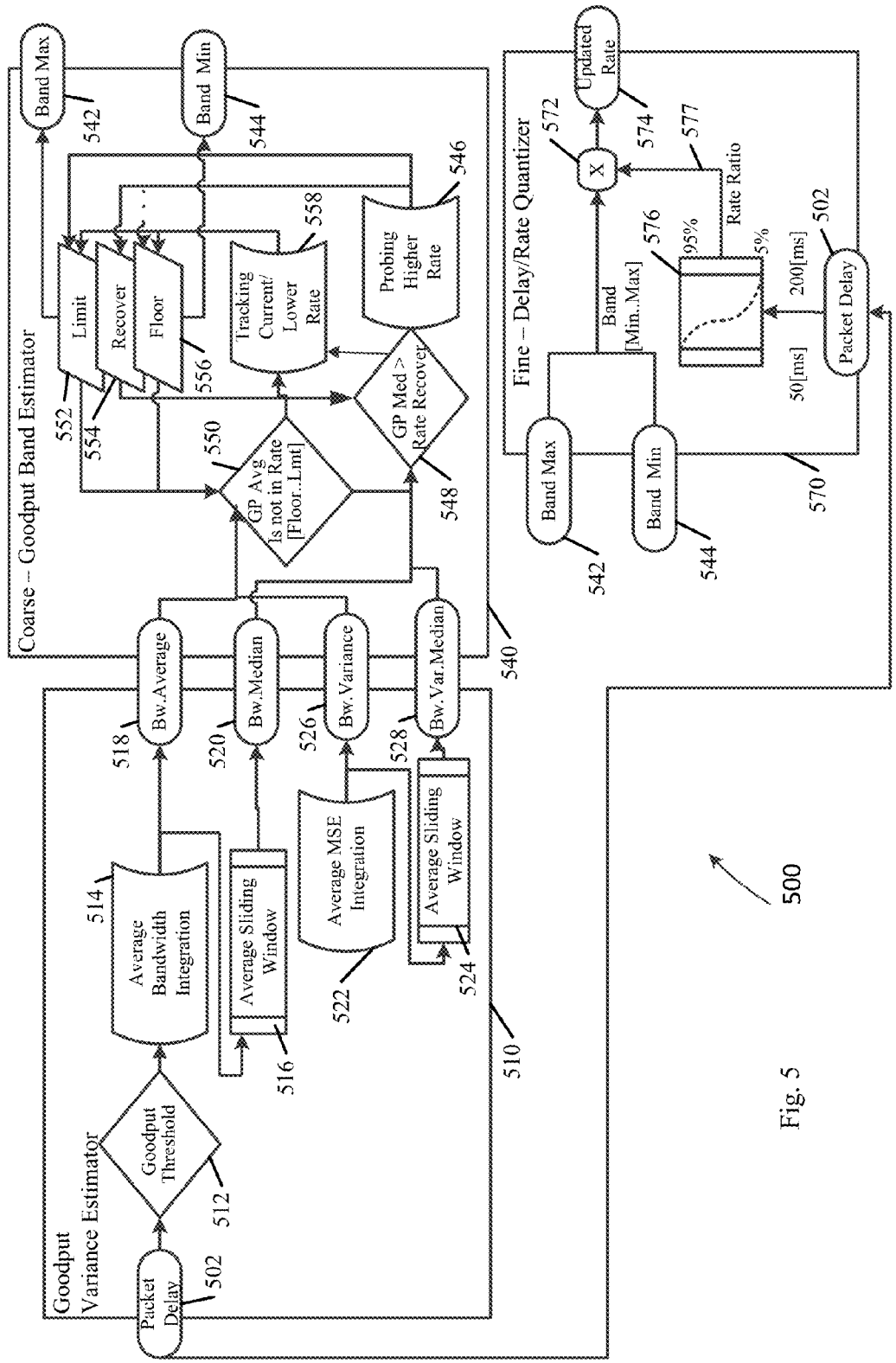
FIG. 5 is a schematic block diagram illustration of a rate adaptation module, in accordance with some demonstrative embodiments.

Reference is made to FIG. 5, which schematically illustrates a rate adaptation module 500, in accordance with some demonstrative embodiments. In some demonstrative embodiments, rate adaptation module 500 may perform the functionality of rate adaptation module 400 (FIG. 4).

In some demonstrative embodiments, rate adaptation module 500 may include a goodput variance estimator 510 to dynamically estimate a goodput variance based on a packet delay 502 of a communicated packet.

In some demonstrative embodiments, goodput variance estimator 510 may include a goodput threshold block 512 to receive, per a packet, the packet delay 502, e.g., the packet transit-delay of a received packet or the RTD of a transmitted packet, as described above.

In some demonstrative embodiments, goodput threshold block 512 may output a filtered delay of packets according to a packet selection parameter. For example, goodput threshold block 512 may output a filtered delay of packets having a packet delay less than the packet delay threshold, e.g., as described above.

In some demonstrative embodiments, goodput variance estimator 510 may include an average bandwidth (BW) Integration module 514 configured to receive per "filtered" goodput packet, a time-stamp and payload-size of the goodput packet, and to dynamically update a goodput bandwidth average, denoted gp_avg, e.g., as follows:

$$gp\_avg = S[n] = (\text{decayAlpha})*S[n-1] + (1-\text{decayAlpha})*Xn \quad (1)$$

wherein S[n] denotes the goodput bandwidth average being updated with respect to the current packet (the n-th packet); wherein S[n−1] denotes a previous goodput bandwidth average updated with respect to a previous packet (the (n−1)th packet); wherein decayAlpha denotes a predefined constant, e.g., between zero and one; and wherein Xn denotes an integration value of a goodput parameter over a predefined moving window of time. In one example, Xn may include a goodput delivery ratio. For example, the value Xn may include a sum of the payload-sizes of a plurality of packets, including the n-th packet and one or more previous packets, communicated over the predefined moving window, divided by a time-difference of the predefined moving window of time.

In some demonstrative embodiments, goodput variance estimator 510 may include a register 518 to store the goodput bandwidth average gp_avg, e.g., as determined according to Equation 1.

In some demonstrative embodiments, goodput variance estimator 510 may include an average means square error (MSE) Integration module 522 configured to receive the bandwidth average S[n] and the integration value Xn. MSE integration module 522 may be configured to calculate an average of a squared difference $(S[n]-Xn)^2$, e.g., as follows:

$$V[n] = (\text{decayAlpha})*V[n-1] + (1-\text{decayAlpha})*(S[n]-Xn)^2 \quad (2)$$

wherein V[n] denotes the average squared difference being updated with respect to the n-th packet; and wherein V[n−1] denotes a previous average squared difference updated with respect to the (n−1)th packet.

In some demonstrative embodiments, MSE integration module 522 may be configured to calculate a dynamically updated BW variance, denoted gp_var_avg, based on the average squared difference, e.g., s follows:

$$gp\_var\_avg = \text{Var}[n] = \text{sqrt}(V[n]) \quad (3)$$

In some demonstrative embodiments, goodput variance estimator 510 may include a register 526 to store updated value of gp_var_avg, e.g., according to Equation 3.

In some demonstrative embodiments, goodput variance estimator 510 may include an average sliding window 516 configured to receive the value of S[n], and to store the value of S[n] in an array of values. The array may be shifted on each timed-input value, where the newest sample on one side, pushes the oldest sample out, from the other side, for example, such that the array includes the values of {S[n−m], S[n−m+1] ... S[n]}, wherein m denotes the array length of the sliding window.

In some demonstrative embodiments, average sliding window 516 may output the following results, per each timed-input, over the given set of values in the array of length m:

$$\text{Average}(S) = \text{sum}(S[n-m], S[n-m+1] \ldots S[n]))/m \quad (4)$$

$$gp\_med = \text{median}(S) = \text{middle value in sorted set of values in the array}\{S[n-m], S[n-m+1] \ldots S[n]\} \quad (5)$$

$$\text{Min}(S) = \text{minimum}(S[n-m], S[n-m+1] \ldots S[n])) \quad (6)$$

$$\text{Max}(S) = \text{Maximum}(S[n-m], S[n-m+1] \ldots S[n])) \quad (7)$$

In some demonstrative embodiments, goodput variance estimator 510 may include one or more registers 520 to store updated values of Equations 4, 5, 6, and/or 7.

In some demonstrative embodiments, goodput variance estimator 510 may include an average sliding window 524 configured to receive the value of Var[n], and to store the value of Var[n] in an array of values. The array may be shifted on each timed-input value, where the newest sample on one side, pushes the oldest sample out, from the other side, for example, such that the array includes the values of {Var[n−m], Var[n−m+1] ... Var[n]}.

In some demonstrative embodiments, average sliding window 524 may output the following results, per each timed-input, over the given set of values in the array of length m:

$$\text{Average}(\text{Var}) = \text{sum}(\text{Var}[n-m], \text{Var}[n-m+1] \ldots \text{Var}[n]))/m \quad (8)$$

$$gp\_var\_med = \text{median}(\text{Var}) = \text{middle value in sorted set of values in the array}\{\text{Var}[n-m], \text{Var}[n-m+1] \ldots \text{Var}[n]\} \quad (9)$$

$$\text{Min}(\text{Var}) = \text{minimum}(\text{Var}[n-m], \text{Var}[n-m+1] \ldots \text{Var}[n])) \quad (10)$$

$$\text{Max}(\text{Var}) = \text{Maximum}(\text{Var}[n-m], \text{Var}[n-m+1] \ldots \text{Var}[n])) \quad (11)$$

In some demonstrative embodiments, goodput variance estimator 510 may include one or more registers 528 to store updated values of Equations 8, 9, 10 and/or 11.

In some demonstrative embodiments, rate adaptation module 500 may include a goodput band estimator 540 to dynamically estimate a bit-rate band based on the packet delay 502.

In some demonstrative embodiments, goodput band estimator 540 may include a register 552 to maintain a current value of a rate limit, a register 554 to maintain a current value of a rate recover, and a register 556 to maintain a current value of a rate floor, e.g., as described below.

In some demonstrative embodiments, goodput band estimator 540 may include a tracking current/lower rate module 558 and a probing higher rate module 546 configured to dynamically update the values of registers 552, 554 and/or 556, e.g., as described below.

In some demonstrative embodiments, goodput band estimator 540 may receive the rate-floor from register 556, the rate-limit from register 552, the value of gp_avg from register 518, the value gp_med from register 520, the value of gp_var_avg from register 526, and the value of gp_var_med from register 528.

In some demonstrative embodiments, goodput band estimator 540 may include a comparison block 550 to determine whether the value of gp_avg is not within the range of [rate floor-to-rate-limit].

In some demonstrative embodiments, goodput band estimator 540 may include a comparison block 548 to determine whether the value of gp_med is greater than the value of the rate recover in register 554.

In some demonstrative embodiments, goodput band estimator 540 may be configured to update the registers 552, 554 and 556, for example, if the value of gp_avg is not within the range of [rate floor-to-rate-limit]. For example, tracking current/lower rate module 558 may be configured to dynamically update the values of registers 552, 554 and/or 556, for example, if the value of gp_avg is not within the range of [rate floor-to-rate-limit]. In one example, tracking current/lower rate module 558 may be configured to update the registers 552, 554 and 556, for example, as follows:

Updated rate-limit=$gp$_med+2*$gp$_var_med

Updated rate-floor=$gp$_avg−2*$gp$_var_avg

Updated rate-recover=$gp$_med (12)

In some demonstrative embodiments, goodput band estimator 540 may be configured to update the registers 552, 554 and 556, for example, if the value of gp_med is greater than the value of the rate recover in register 554. For example, probing higher rate module 558 may be configured to dynamically update the values of registers 552, 554 and/or 556 based on the output of block 548, e.g., if the value of gp_med is greater than the value of the rate recover in register 554. In one example, probing higher rate module 558 may be configured to update the registers 552, 554 and 556, for example, as follows:

Updated rate-limit=$gp$_med+2*$gp$_var_med

Updated rate-floor=$gp$_avg−1*$gp$_var_med

Updated rate-recover=$gp$_med+$gp$_var_med (13)

In other embodiments, the values Updated rate-limit, Updated rate floor and/or Updated rate-recover may be updated according to any other function and/or algorithm.

In some demonstrative embodiments, goodput band estimator 540 may include a register 542 to store a maximal band value, denoted Band_Max, based on the value of the register 552, and a register 544 to store a minimal band value, denoted Band_Min, based on the value of the register 556.

In some demonstrative embodiments, rate adaptation module 500 may include a fine bit rate estimator 570 to determine an updated bit rate 574 based on the packet delay 502 and the Band_Max and Band_Min values.

In some demonstrative embodiments, fine bit rate estimator 570 may include an adaptation coefficient block 576 to determine a bit-rate adaptation coefficient ("rate ratio") 577 based on the packet delay 502, e.g., as described below.

In some demonstrative embodiments, adaptation coefficient block 576 may determine the bit-rate adaptation coefficient based on a predefined relationship between packet delay values and bit-rate adaptation coefficient values. In one example, adaptation coefficient block 576 may perform the functionality of mapper 426 (FIG. 4).

In some demonstrative embodiments, adaptation coefficient block 576 may determine the bit-rate adaptation coefficient 577 by mapping the packet delay 502 to a defined delay range 576. For example, delay range 576 may be defined by an application, e.g., a video application, to utilize the video data of the communicated packets. In one example, delay range 576 may define an absolute delay range, e.g., between a minimal delay and a maximal delay, which may be allowed for the video data.

In some demonstrative embodiments, adaptation coefficient block 576 may determine bit-rate adaptation coefficient 577 in the form of a percentile based on a rate ratio between the packet delay 502 and the delay range 576.

In some demonstrative embodiments, adaptation coefficient block 576 may select the bit-rate adaptation coefficient 577 from a predefined plurality of bit-rate adaptation coefficient values.

In one example, adaptation coefficient block 576 may select bit-rate adaptation coefficient from a LUT, e.g., based on the packet delay 502. For example, the LUT may include a rate conversion table.

In one demonstrative embodiment, the rate conversion table may be defined with respect to a range of packet delays defined by a minimal packet delay, a packet delay step and a maximal packet delay. For example, the range [50:10:250] may define packet delays between 50 milliseconds (ms) and 250 ms at a delay step of 10 ms.

For example, the rate conversion table may include a set of bit-rate adaptation coefficients defined with respect to the range of packet delays.

In one example, the rate conversion table may be defined according to a concave function, a convex function, or a combination thereof, e.g., as follows:

%-- concave
  Table=[[50:10:250]; power(10, (0:5:100)/100)]';
%-- convex
  Table=[[50:10:250]; log 10((10:−0.5:1.1))]';
*the first brackets define the range of the delays [50 . . . 250] ms;
*the second brackets define the range of the rate-factor-coefficients, produced as concave/convex functions, for example, such that the result of a power-of-10/log-base-10 functions, to points in the range of [0 . . . 100] or [10 . . . 1], respectively. For example, selection between the concave function and the convex function may be made according to a desired aggressiveness rate of adaptation and/or according to any other criterion.

In other embodiments, adaptation coefficient block 576 may determine the bit-rate adaptation coefficient based on any other criterion.

In some demonstrative embodiments, fine bit rate estimator 570 may be configured to determine the adapted bit-rate 574 based on the bit-rate adaptation coefficient 577 and the bit-rate band defined by the values Band_Min and Band_Max.

In some demonstrative embodiments, fine bit rate estimator 570 may include a multiplier 572 to determine the adapted bit-rate 574 by multiplying bit-rate adaptation coefficient 577 with the bit-rate band defined by the values Band_Min and Band_Max.

In one example, fine bit rate estimator 570 may determine the adapted bit-rate 574, for example as follows:

$$\text{Adpt\_bitrate} = \text{Band\_Min} + \text{Coeff}^*[\text{Band\_Max} - \text{Band\_Min}] \qquad (14)$$

wherein Adpt_bitrate denotes the adapted bit-rate 574, and Coeff denotes bit-rate adaptation coefficient 577.

Figure 6:
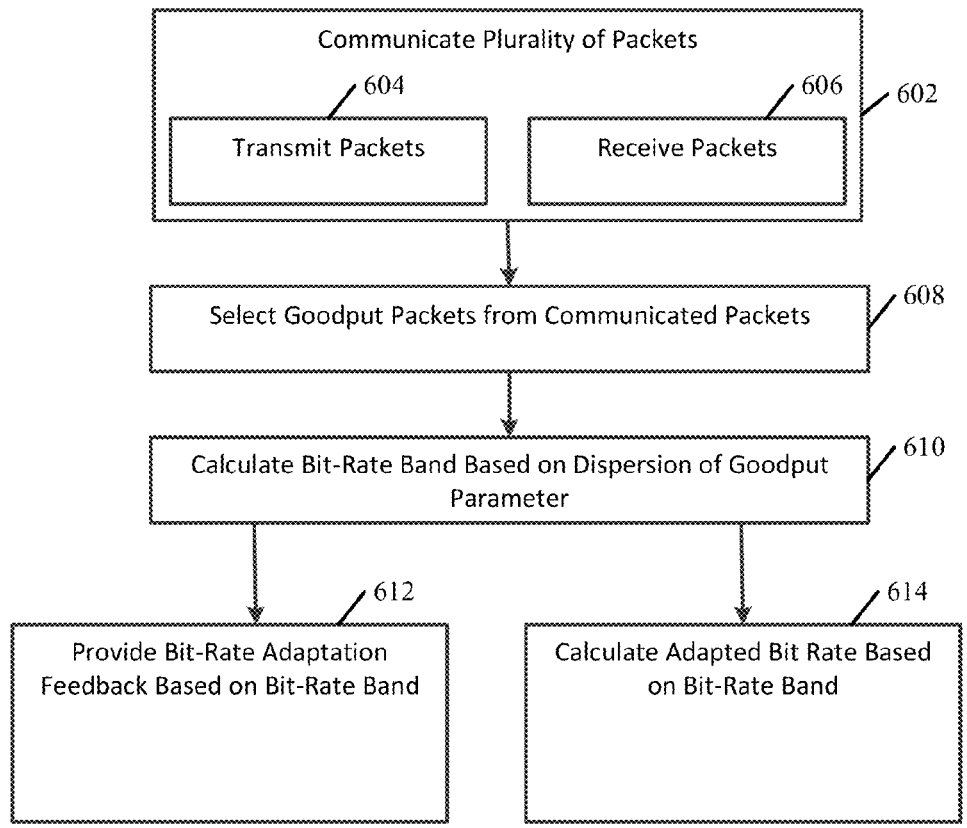
FIG. 6 is a schematic flow-chart illustration of a method of rate adaptation, in accordance with some demonstrative embodiments.

FIG. 6 is a schematic flow-chart illustration of a method of rate adaptation, in accordance with some demonstrative embodiments. In some demonstrative embodiments, one or more of the operations of the method of FIG. 6 may be performed by a device, e.g., device 102 (FIG. 1) and/or device 104 (FIG. 1), and/or a rate adaptation module, e.g., rate adaptation module 170 (FIG. 1), rate adaptation module 180 (FIG. 1), rate adaptation module 300 (FIG. 3), rate adaptation module 400 (FIG. 4), and/or rate adaptation module 500 (FIG. 5).

As indicated at block 602, the method may include communicating a plurality of packets, e.g., video packets.

As indicated at block 604, communicating the packets may include transmitting the plurality of packets. For example, device 104 (FIG. 1) may transmit the packets including encoded video data to device 102 (FIG. 1), e.g., as described above.

As indicated at block 606, communicating the packets may include receiving the plurality of packets. For example, device 102 (FIG. 1) may receive the packets including encoded video data from device 104 (FIG. 1), e.g., as described above.

As indicated at block 608, the method may include selecting a plurality of goodput packets from the plurality of communicated packets, based on at least one selection parameter corresponding to the plurality of communicated packets. In one example, rate adaptation module 170 (FIG. 1) may select the plurality of goodput packets from the plurality of packets received by device 102 (FIG. 1), e.g., as described above. In another example, rate adaptation module 180 (FIG. 1) may select the plurality of goodput packets from the plurality of packets transmitted by device 104 (FIG. 1), e.g., as described above.

As indicated at block 610, the method may include calculating a bit-rate band based on a dispersion of a goodput parameter corresponding to the plurality of goodput packets. For example, band calculator 308 (FIG. 3) may calculate bit-rate band 309 FIG. 3), e.g., as described above.

As indicated at block 612, in some demonstrative embodiments the method may include providing a bit-rate adaptation feedback based on the bit-rate band. For example, feedback module 312 (FIG. 3) may provide to device 104 (FIG. 1) a bit-rate adaptation feedback based on the bit-rate band 309 (FIG. 3), e.g., as described above.

In some demonstrative embodiments, the bit-rate adaptation feedback may include the bit-rate band. For example, feedback module 312 (FIG. 3) may provide to device 104 (FIG. 1) the bit-rate adaptation feedback including the bit-rate band 309 (FIG. 3), and bit rate calculator 182 (FIG. 1) may determine an adapted bit-rate based on the bit-rate band 309 (FIG. 3), e.g., as described above.

In some demonstrative embodiments, the bit-rate adaptation feedback may include an adapted bit-rate based on the bit-rate band. For example, feedback module 312 (FIG. 3) may provide to device 104 (FIG. 1) the bit-rate adaptation feedback including the adapted bit-rate 311 (FIG. 3), e.g., as described above.

As indicated at block 614, the method may include calculating an adapted bit-rate based on the bit-rate band. For example, rate adaptation module 180 (FIG. 1) may determine the adapted bit-rate based on the bit-rate band, e.g., as described above.

Figure 7:
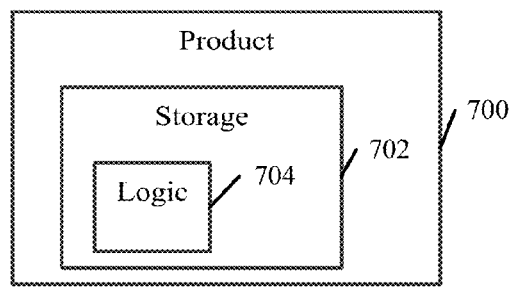
FIG. 7 is a schematic illustration of a product of manufacture, in accordance with some demonstrative embodiments.

Reference is made to FIG. 7, which schematically illustrates an article of manufacture 700, in accordance with some demonstrative embodiments. Article 700 may include a non-transitory machine-readable storage medium 702 to store logic 704, which may be used, for example, to perform at least part of the functionality of devices 102 and/or 104 (FIG. 1), wireless communication units 120 and/or 130 (FIG. 1), rate adaptation module 170 (FIG. 1), rate adaptation module 180 (FIG. 1), rate adaptation module 300 (FIG. 3), rate adaptation module 400 (FIG. 4), rate adaptation module 500 (FIG. 5), bit-rate calculator 172 (FIG. 1), and/or bit rate calculator 182 (FIG. 1), and/or to perform one or more of the operations of the method of FIG. 6. The phrase "non-transitory machine-readable medium" is directed to include all computer-readable media, with the sole exception being a transitory propagating signal.

In some demonstrative embodiments, article 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a packet selector to select at a first device a plurality of goodput packets from a plurality of received packets from a second device, the packet selector to select the plurality of goodput packets based on at least one selection parameter corresponding to the plurality of received packets; a band calculator to calculate a bit-rate band based on a dispersion of a goodput parameter corresponding to the plurality of goodput packets; and a feedback module to provide a bit-rate adaptation feedback to the second device based on the bit-rate band.

Example 2 includes the subject matter of Example 1, and optionally, wherein the selection parameter depends on a network congestion between the second device and the first device.

Example 3 includes the subject matter of Example 1 or 2, and optionally, wherein the selection parameter comprises a delay parameter.

Example 4 includes the subject matter of Example 3, and optionally, wherein the packet selector is to select the plurality of goodput packets based on a comparison between packet delays of the plurality of received packets and a packet delay threshold.

Example 5 includes the subject matter of Example 3 or 4, and optionally, wherein the packet selector is to select the plurality of goodput packets based on a comparison between video frame delays corresponding to the plurality of received packets and a frame delay threshold.

Example 6 includes the subject matter of any one of Examples 1-5, and optionally, wherein the selection parameter comprises a quality parameter.

Example 7 includes the subject matter of Example 6, and optionally, wherein the packet selector is to select the plurality of goodput packets based on a comparison between a quality of data received in the plurality of received packets and a quality threshold.

Example 8 includes the subject matter of any one of Examples 1-7, and optionally, wherein the band calculator is to calculate the bit-rate band based on a variance of the goodput parameter.

Example 9 includes the subject matter of any one of Examples 1-8, and optionally, wherein the goodput parameter comprises a delivery ratio of the goodput packets.

Example 10 includes the subject matter of any one of Examples 1-9, and optionally, wherein the bit-rate adaptation feedback comprises an adapted bit-rate.

Example 11 includes the subject matter of Example 10, and optionally, comprising a bit-rate calculator to determine the adapted bit-rate based on a packet delay of a received packet and the bit-rate band.

Example 12 includes the subject matter of Example 11, and optionally, wherein the bit-rate calculator is to determine a bit-rate adaptation coefficient based on the packet delay of the received packet, and to determine the adapted bit-rate based on the bit-rate adaptation coefficient and the bit-rate band.

Example 13 includes the subject matter of Example 12, and optionally, wherein the bit-rate calculator is to select the bit-rate adaptation coefficient from a plurality of predefined bit-rate adaptation coefficients based on the packet delay of the received packet.

Example 14 includes the subject matter of any one of Examples 1-9, and optionally, wherein the bit-rate adaptation feedback comprises the bit-rate band.

Example 15 includes the subject matter of any one of Examples 1-14, and optionally, wherein the plurality of received packets comprises packets communicated over a wireless communication medium.

Example 16 includes the subject matter of any one of Examples 1-15, and optionally, wherein the plurality of received packets comprises video data, and wherein the bit-rate adaptation feedback indicates an adaptation of a bit-rate of the video data.

Example 17 includes an apparatus comprising a packet selector to select at device a plurality of goodput packets from a plurality of transmitted packets from the device, the packet selector to select the plurality of goodput packets based on at least one selection parameter corresponding to the plurality of transmitted packets; a band calculator to calculate a bit-rate band based on a dispersion of a goodput parameter corresponding to the plurality of goodput packets; and a bit-rate calculator to determine, based on the bit-rate band and a packet delay of a first transmitted packet, a bit-rate to be applied to a second transmitted packet subsequent to the first transmitted packet.

Example 18 includes the subject matter of Example 17, and optionally, wherein the selection parameter depends on a network congestion.

Example 19 includes the subject matter of Example 17 or 18, and optionally, wherein the selection parameter comprises a delay parameter.

Example 20 includes the subject matter of Example 19, and optionally, wherein the packet selector is to select the plurality of goodput packets based on a comparison between packet delays of the plurality of transmitted packets and a packet delay threshold.

Example 21 includes the subject matter of Example 19 or 20, and optionally, wherein the packet selector is to select the plurality of goodput packets based on a comparison between video frame delays corresponding to the plurality of transmitted packets and a frame delay threshold.

Example 22 includes the subject matter of any one of Examples 17-21, and optionally, wherein the selection parameter comprises a quality parameter.

Example 23 includes the subject matter of Example 22, and optionally, wherein the packet selector is to select the plurality of goodput packets based on a comparison between a quality of data transmitted in the plurality of transmitted packets and a quality threshold.

Example 24 includes the subject matter of any one of Examples 17-23, and optionally, wherein the band calculator is to calculate the bit-rate band based on a variance of the goodput parameter.

Example 25 includes the subject matter of any one of Examples 17-24, and optionally, wherein the goodput parameter comprises a delivery ratio of the goodput packets.

Example 26 includes the subject matter of any one of Examples 17-25, and optionally, wherein the bit-rate calculator is to determine a bit-rate adaptation coefficient based on the packet delay of the first transmitted packet, and to determine the bit-rate based on the bit-rate adaptation coefficient and the bit-rate band.

Example 27 includes the subject matter of Example 26, and optionally, wherein the bit-rate calculator is to select the bit-rate adaptation coefficient from a plurality of predefined bit-rate adaptation coefficients based on the packet delay of the first transmitted packet.

Example 28 includes the subject matter of any one of Examples 17-27, and optionally, wherein the plurality of transmitted packets comprises packets communicated over a wireless communication medium.

Example 29 includes the subject matter of any one of Examples 17-28, and optionally, wherein the plurality of transmitted packets comprises video data, and wherein the bit-rate comprises a bit-rate of the video data.

Example 30 includes a first wireless communication device comprising a memory; a processor; a wireless communication unit to receive a plurality of received packets from a second wireless communication device; and a rate adaptation module to select a plurality of goodput packets from the plurality of received packets, based on at least one selection parameter corresponding to the plurality of received packets; to calculate a bit-rate band based on a dispersion of a goodput parameter corresponding to the plurality of goodput packets; and to provide a bit-rate adaptation feedback to the second communication device based on the bit-rate band.

Example 31 includes the subject matter of Example 30, and optionally, wherein the selection parameter depends on a network congestion between the second wireless communication device and the first wireless communication device.

Example 32 includes the subject matter of Example 30 or 31, and optionally, wherein the selection parameter comprises a delay parameter.

Example 33 includes the subject matter of Example 32, and optionally, wherein the rate adaptation module is to select the plurality of goodput packets based on a comparison between packet delays of the plurality of received packets and a packet delay threshold.

Example 34 includes the subject matter of Example 32 or 33, and optionally, wherein the rate adaptation module is to select the plurality of goodput packets based on a comparison between video frame delays corresponding to the plurality of received packets and a frame delay threshold.

Example 35 includes the subject matter of any one of Examples 30-34, and optionally, wherein the selection parameter comprises a quality parameter.

Example 36 includes the subject matter of Example 35, and optionally, wherein the rate adaptation module is to select the plurality of goodput packets based on a comparison between a quality of data received in the plurality of received packets and a quality threshold.

Example 37 includes the subject matter of any one of Examples 30-36, and optionally, wherein the rate adaptation module is to calculate the bit-rate band based on a variance of the goodput parameter.

Example 38 includes the subject matter of any one of Examples 30-37, and optionally, wherein the goodput parameter comprises a delivery ratio of the goodput packets.

Example 39 includes the subject matter of any one of Examples 30-38, and optionally, wherein the bit-rate adaptation feedback comprises an adapted bit-rate.

Example 40 includes the subject matter of Example 39, and optionally, wherein the rate adaptation module is to determine the adapted bit-rate based on a packet delay of a received packet and the bit-rate band.

Example 41 includes the subject matter of Example 40, and optionally, wherein the rate adaptation module is to determine a bit-rate adaptation coefficient based on the packet delay of the received packet, and to determine the adapted bit-rate based on the bit-rate adaptation coefficient and the bit-rate band.

Example 42 includes the subject matter of Example 41, and optionally, wherein the rate adaptation module is to select the bit-rate adaptation coefficient from a plurality of predefined bit-rate adaptation coefficients based on the packet delay of the received packet.

Example 43 includes the subject matter of any one of Examples 30-38, and optionally, wherein the bit-rate adaptation feedback comprises the bit-rate band.

Example 44 includes the subject matter of any one of Examples 30-43, and optionally, wherein the plurality of received packets comprises video data, and wherein the bit-rate adaptation feedback indicates an adaptation of a bit-rate of the video data.

Example 45 includes a wireless communication device comprising a memory; a processor; a wireless communication unit to transmit a plurality of transmitted packets; and a rate adaptation module to select a plurality of goodput packets from the plurality of transmitted packets, based on at least one selection parameter corresponding to the plurality of transmitted packets; to calculate a bit-rate band based on a dispersion of a goodput parameter corresponding to the plurality of goodput packets; and based on the bit-rate band and a packet delay of a first transmitted packet, to determine a bit-rate to be applied to a second transmitted packet subsequent to the first transmitted packet.

Example 46 includes the subject matter of Example 45, and optionally, wherein the selection parameter depends on a network congestion.

Example 47 includes the subject matter of Example 45 or 46, and optionally, wherein the selection parameter comprises a delay parameter.

Example 48 includes the subject matter of Example 47, and optionally, wherein the rate adaptation module is to select the plurality of goodput packets based on a comparison between packet delays of the plurality of transmitted packets and a packet delay threshold.

Example 49 includes the subject matter of Example 47 or 48, and optionally, wherein the rate adaptation module is to select the plurality of goodput packets based on a comparison between video frame delays corresponding to the plurality of transmitted packets and a frame delay threshold.

Example 50 includes the subject matter of any one of Examples 45-49, and optionally, wherein the selection parameter comprises a quality parameter.

Example 51 includes the subject matter of Example 50, and optionally, wherein the rate adaptation module is to select the plurality of goodput packets based on a comparison between a quality of data transmitted in the plurality of transmitted packets and a quality threshold.

Example 52 includes the subject matter of any one of Examples 45-51, and optionally, wherein the rate adaptation module is to calculate the bit-rate band based on a variance of the goodput parameter.

Example 53 includes the subject matter of any one of Examples 45-52, and optionally, wherein the goodput parameter comprises a delivery ratio of the goodput packets.

Example 54 includes the subject matter of any one of Examples 45-53, and optionally, wherein the rate adaptation module is to determine a bit-rate adaptation coefficient based on the packet delay of the first transmitted packet, and to determine the bit-rate based on the bit-rate adaptation coefficient and the bit-rate band.

Example 55 includes the subject matter of Example 54, and optionally, wherein the rate adaptation module is to select the bit-rate adaptation coefficient from a plurality of predefined bit-rate adaptation coefficients based on the packet delay of the first transmitted packet.

Example 56 includes the subject matter of any one of Examples 45-55, and optionally, wherein the plurality of transmitted packets comprises video data, and wherein the bit-rate comprises a bit-rate of the video data.

Example 57 includes a first communication device comprising a memory; a processor; a communication unit to transmit a plurality of transmitted packets to a second communication device, and to receive a bit-rate band from the second communication device; and a bit rate calculator to determine, based the bit-rate band and a packet delay of a first transmitted packet, a bit-rate to be applied to a second transmitted packet subsequent to the first transmitted packet.

Example 58 includes the subject matter of Example 57, and optionally, wherein the bit-rate calculator is to determine a bit-rate adaptation coefficient based on the packet delay of the first transmitted packet, and to determine the bit-rate based on the bit-rate adaptation coefficient and the bit-rate band.

Example 59 includes the subject matter of Example 58, and optionally, wherein the bit-rate calculator is to select the bit-rate adaptation coefficient from a plurality of predefined bit-rate adaptation coefficients based on the packet delay of the first transmitted packet.

Example 60 includes the subject matter of any one of Examples 57-59, and optionally, wherein the plurality of transmitted packets comprises packets communicated over a wireless communication medium.

Example 61 includes the subject matter of any one of Examples 57-60, and optionally, wherein the plurality of transmitted packets comprises video data, and wherein the bit-rate comprises a bit-rate of the video data.

Example 62 includes a method performed at a first device, the method comprising receiving a plurality of received packets from a second device; selecting a plurality of goodput packets from the plurality of received packets, based on at least one selection parameter corresponding to the plurality of received packets; calculating a bit-rate band based on a dispersion of a goodput parameter corresponding to the plurality of goodput packets; and providing a bit-rate adaptation feedback to the second device based on the bit-rate band.

Example 63 includes the subject matter of Example 62, and optionally, wherein the selection parameter depends on a network congestion between the second device and the first device.

Example 64 includes the subject matter of Example 62 or 63, and optionally, wherein the selection parameter comprises a delay parameter.

Example 65 includes the subject matter of Example 64, and optionally, comprising selecting the plurality of goodput packets based on a comparison between packet delays of the plurality of received packets and a packet delay threshold.

Example 66 includes the subject matter of Example 64 or 65, and optionally, comprising selecting the plurality of goodput packets based on a comparison between video frame delays corresponding to the plurality of received packets and a frame delay threshold.

Example 67 includes the subject matter of any one of Examples 62-66, and optionally, wherein the selection parameter comprises a quality parameter.

Example 68 includes the subject matter of Example 67, and optionally, comprising selecting the plurality of goodput packets based on a comparison between a quality of data received in the plurality of received packets and a quality threshold.

Example 69 includes the subject matter of any one of Examples 62-68, and optionally, comprising calculating the bit-rate band based on a variance of the goodput parameter.

Example 70 includes the subject matter of any one of Examples 62-69, and optionally, wherein the goodput parameter comprises a delivery ratio of the goodput packets.

Example 71 includes the subject matter of any one of Examples 62-70, and optionally, wherein the bit-rate adaptation feedback comprises an adapted bit-rate.

Example 72 includes the subject matter of Example 71, and optionally, comprising determining the adapted bit-rate based on a packet delay of a received packet and the bit-rate band.

Example 73 includes the subject matter of Example 72, and optionally, comprising determining a bit-rate adaptation coefficient based on the packet delay of the received packet, and determining the adapted bit-rate based on the bit-rate adaptation coefficient and the bit-rate band.

Example 74 includes the subject matter of Example 73, and optionally, comprising selecting the bit-rate adaptation coefficient from a plurality of predefined bit-rate adaptation coefficients based on the packet delay of the received packet.

Example 75 includes the subject matter of any one of Examples 62-70, and optionally, wherein the bit-rate adaptation feedback comprises the bit-rate band.

Example 76 includes the subject matter of any one of Examples 62-75, and optionally, wherein the plurality of received packets comprises packets communicated over a wireless communication medium.

Example 77 includes the subject matter of any one of Examples 62-76, and optionally, wherein the plurality of received packets comprises video data, and wherein the bit-rate adaptation feedback indicates an adaptation of a bit-rate of the video data.

Example 78 includes a method comprising transmitting a plurality of transmitted packets; selecting a plurality of goodput packets from the plurality of transmitted packets, based on at least one selection parameter corresponding to the plurality of transmitted packets; calculating a bit-rate band based on a dispersion of a goodput parameter corresponding to the plurality of goodput packets; and based on the bit-rate band and a packet delay of a first transmitted packet, applying a bit rate to a second transmitted packet subsequent to the first transmitted packet.

Example 79 includes the subject matter of Example 78, and optionally, wherein the selection parameter depends on a network congestion.

Example 80 includes the subject matter of Example 78 or 79, and optionally, wherein the selection parameter comprises a delay parameter.

Example 81 includes the subject matter of Example 80, and optionally, comprising selecting the plurality of goodput packets based on a comparison between packet delays of the plurality of transmitted packets and a packet delay threshold.

Example 82 includes the subject matter of Example 80 or 81, and optionally, comprising selecting the plurality of goodput packets based on a comparison between video frame delays corresponding to the plurality of transmitted packets and a frame delay threshold.

Example 83 includes the subject matter of any one of Examples 78-82, and optionally, wherein the selection parameter comprises a quality parameter.

Example 84 includes the subject matter of Example 83, and optionally, comprising selecting the plurality of goodput packets based on a comparison between a quality of data transmitted in the plurality of transmitted packets and a quality threshold.

Example 85 includes the subject matter of any one of Examples 78-84, and optionally, comprising calculating the bit-rate band based on a variance of the goodput parameter.

Example 86 includes the subject matter of any one of Examples 78-85, and optionally, wherein the goodput parameter comprises a delivery ratio of the goodput packets.

Example 87 includes the subject matter of any one of Examples 78-86, and optionally, comprising determining a bit-rate adaptation coefficient based on the packet delay of the first transmitted packet, and determining the bit-rate based on the bit-rate adaptation coefficient and the bit-rate band.

Example 88 includes the subject matter of Example 87, and optionally, comprising selecting the bit-rate adaptation coefficient from a plurality of predefined bit-rate adaptation coefficients based on the packet delay of the first transmitted packet.

Example 89 includes the subject matter of any one of Examples 78-88, and optionally, wherein the plurality of transmitted packets comprises packets communicated over a wireless communication medium.

Example 90 includes the subject matter of any one of Examples 78-89, and optionally, wherein the plurality of transmitted packets comprises video data, and wherein the bit-rate comprises a bit-rate of the video data.

Example 91 includes a product including a non-transitory storage medium having stored thereon instructions that, when executed by a machine, result in receiving a plurality of received packets from a communication device; selecting a plurality of goodput packets from the plurality of received packets, based on at least one selection parameter corresponding to the plurality of received packets; calculating a bit-rate band based on a dispersion of a goodput parameter corresponding to the plurality of goodput packets; and providing a bit-rate adaptation feedback to the communication device based on the bit-rate band.

Example 92 includes the subject matter of Example 91, and optionally, wherein the selection parameter depends on a network congestion.

Example 93 includes the subject matter of Example 91 or 92, and optionally, wherein the selection parameter comprises a delay parameter.

Example 94 includes the subject matter of Example 93, and optionally, wherein the instructions result in selecting the plurality of goodput packets based on a comparison between packet delays of the plurality of received packets and a packet delay threshold.

Example 95 includes the subject matter of Example 93 or 94, and optionally, wherein the instructions result in selecting the plurality of goodput packets based on a comparison between video frame delays corresponding to the plurality of received packets and a frame delay threshold.

Example 96 includes the subject matter of any one of Examples 91-95, and optionally, wherein the selection parameter comprises a quality parameter.

Example 97 includes the subject matter of Example 96, and optionally, wherein the instructions result in selecting the plurality of goodput packets based on a comparison between a quality of data received in the plurality of received packets and a quality threshold.

Example 98 includes the subject matter of any one of Examples 91-97, and optionally, wherein the instructions result in calculating the bit-rate band based on a variance of the goodput parameter.

Example 99 includes the subject matter of any one of Examples 91-98, and optionally, wherein the goodput parameter comprises a delivery ratio of the goodput packets.

Example 100 includes the subject matter of any one of Examples 91-99, and optionally, wherein the bit-rate adaptation feedback comprises an adapted bit-rate.

Example 101 includes the subject matter of Example 100, and optionally, wherein the instructions result in determining the adapted bit-rate based on a packet delay of a received packet and the bit-rate band.

Example 102 includes the subject matter of Example 101, and optionally, wherein the instructions result in determining a bit-rate adaptation coefficient based on the packet delay of the received packet, and determining the adapted bit-rate based on the bit-rate adaptation coefficient and the bit-rate band.

Example 103 includes the subject matter of Example 102, and optionally, wherein the instructions result in selecting the bit-rate adaptation coefficient from a plurality of predefined bit-rate adaptation coefficients based on the packet delay of the received packet.

Example 104 includes the subject matter of any one of Examples 91-99, and optionally, wherein the bit-rate adaptation feedback comprises the bit-rate band.

Example 105 includes the subject matter of any one of Examples 91-104, and optionally, wherein the plurality of received packets comprises packets communicated over a wireless communication medium.

Example 106 includes the subject matter of any one of Examples 91-105, and optionally, wherein the plurality of received packets comprises video data, and wherein the bit-rate adaptation feedback indicates an adaptation of a bit-rate of the video data.

Example 107 includes a product including a non-transitory storage medium having stored thereon instructions that, when executed by a machine, result in transmitting a plurality of transmitted packets; selecting a plurality of goodput packets from the plurality of transmitted packets, based on at least one selection parameter corresponding to the plurality of transmitted packets; calculating a bit-rate band based on a dispersion of a goodput parameter corresponding to the plurality of goodput packets; and based on the bit-rate band and a packet delay of a first transmitted packet, applying a bit rate to a second transmitted packet subsequent to the first transmitted packet.

Example 108 includes the subject matter of Example 107, and optionally, wherein the selection parameter depends on a network congestion.

Example 109 includes the subject matter of Example 107 or 108, and optionally, wherein the selection parameter comprises a delay parameter.

Example 110 includes the subject matter of Example 109, and optionally, wherein the instructions result in selecting the plurality of goodput packets based on a comparison between packet delays of the plurality of transmitted packets and a packet delay threshold.

Example 111 includes the subject matter of Example 109 or 110, and optionally, wherein the instructions result in selecting the plurality of goodput packets based on a comparison between video frame delays corresponding to the plurality of transmitted packets and a frame delay threshold.

Example 112 includes the subject matter of any one of Examples 107-111, and optionally, wherein the selection parameter comprises a quality parameter.

Example 113 includes the subject matter of Example 112, and optionally, wherein the instructions result in selecting the plurality of goodput packets based on a comparison between a quality of data transmitted in the plurality of transmitted packets and a quality threshold.

Example 114 includes the subject matter of any one of Examples 107-113, and optionally, wherein the instructions result in calculating the bit-rate band based on a variance of the goodput parameter.

Example 115 includes the subject matter of any one of Examples 107-114, and optionally, wherein the goodput parameter comprises a delivery ratio of the goodput packets.

Example 116 includes the subject matter of any one of Examples 107-115, and optionally, wherein the instructions result in determining a bit-rate adaptation coefficient based on the packet delay of the first transmitted packet, and determining the bit-rate based on the bit-rate adaptation coefficient and the bit-rate band.

Example 117 includes the subject matter of Example 116, and optionally, wherein the instructions result in selecting the bit-rate adaptation coefficient from a plurality of predefined bit-rate adaptation coefficients based on the packet delay of the first transmitted packet.

Example 118 includes the subject matter of any one of Examples 107-117, and optionally, wherein the plurality of transmitted packets comprises packets communicated over a wireless communication medium.

Example 119 includes the subject matter of any one of Examples 107-118, and optionally, wherein the plurality of transmitted packets comprises video data, and wherein the bit-rate comprises a bit-rate of the video data.

Example 120 includes an apparatus comprising means for receiving at a first device a plurality of received packets from a second device; means for selecting a plurality of goodput packets from the plurality of received packets, based on at least one selection parameter corresponding to the plurality of received packets; means for calculating a bit-rate band based on a dispersion of a goodput parameter corresponding to the plurality of goodput packets; and means for providing a bit-rate adaptation feedback to the second device based on the bit-rate band.

Example 121 includes the subject matter of Example 120, and optionally, wherein the selection parameter depends on a network congestion between the second device and the first device.

Example 122 includes the subject matter of Example 120 or 121, and optionally, wherein the selection parameter comprises a delay parameter.

Example 123 includes the subject matter of Example 122, and optionally, comprising means for selecting the plurality of goodput packets based on a comparison between packet delays of the plurality of received packets and a packet delay threshold.

Example 124 includes the subject matter of Example 122 or 123, and optionally, comprising means for selecting the plurality of goodput packets based on a comparison between video frame delays corresponding to the plurality of received packets and a frame delay threshold.

Example 125 includes the subject matter of any one of Examples 120-124, and optionally, wherein the selection parameter comprises a quality parameter.

Example 126 includes the subject matter of Example 125, and optionally, comprising means for selecting the plurality of goodput packets based on a comparison between a quality of data received in the plurality of received packets and a quality threshold.

Example 127 includes the subject matter of any one of Examples 120-126, and optionally, comprising means for calculating the bit-rate band based on a variance of the goodput parameter.

Example 128 includes the subject matter of any one of Examples 120-127, and optionally, wherein the goodput parameter comprises a delivery ratio of the goodput packets.

Example 129 includes the subject matter of any one of Examples 120-128, and optionally, wherein the bit-rate adaptation feedback comprises an adapted bit-rate.

Example 130 includes the subject matter of Example 129, and optionally, comprising means for determining the adapted bit-rate based on a packet delay of a received packet and the bit-rate band.

Example 131 includes the subject matter of Example 130, and optionally, comprising means for determining a bit-rate adaptation coefficient based on the packet delay of the received packet, and determining the adapted bit-rate based on the bit-rate adaptation coefficient and the bit-rate band.

Example 132 includes the subject matter of Example 131, and optionally, comprising means for selecting the bit-rate adaptation coefficient from a plurality of predefined bit-rate adaptation coefficients based on the packet delay of the received packet.

Example 133 includes the subject matter of any one of Examples 120-128, and optionally, wherein the bit-rate adaptation feedback comprises the bit-rate band.

Example 134 includes the subject matter of any one of Examples 120-133, and optionally, wherein the plurality of received packets comprises packets communicated over a wireless communication medium.

Example 135 includes the subject matter of any one of Examples 120-134, and optionally, wherein the plurality of received packets comprises video data, and wherein the bit-rate adaptation feedback indicates an adaptation of a bit-rate of the video data.

Example 136 includes an apparatus comprising means for transmitting a plurality of transmitted packets; means for selecting a plurality of goodput packets from the plurality of transmitted packets, based on at least one selection parameter corresponding to the plurality of transmitted packets; means for calculating a bit-rate band based on a dispersion of a goodput parameter corresponding to the plurality of goodput packets; and means for, based on the bit-rate band and a packet delay of a first transmitted packet, applying a bit rate to a second transmitted packet subsequent to the first transmitted packet.

Example 137 includes the subject matter of Example 136, and optionally, wherein the selection parameter depends on a network congestion.

Example 138 includes the subject matter of Example 136 or 137, and optionally, wherein the selection parameter comprises a delay parameter.

Example 139 includes the subject matter of Example 138, and optionally, comprising means for selecting the plurality of goodput packets based on a comparison between packet delays of the plurality of transmitted packets and a packet delay threshold.

Example 140 includes the subject matter of Example 138 or 139, and optionally, comprising means for selecting the plurality of goodput packets based on a comparison between video frame delays corresponding to the plurality of transmitted packets and a frame delay threshold.

Example 141 includes the subject matter of any one of Examples 136-140, and optionally, wherein the selection parameter comprises a quality parameter.

Example 142 includes the subject matter of Example 141, and optionally, comprising means for selecting the plurality of goodput packets based on a comparison between a quality of data transmitted in the plurality of transmitted packets and a quality threshold.

Example 143 includes the subject matter of any one of Examples 136-142, and optionally, comprising means for calculating the bit-rate band based on a variance of the goodput parameter.

Example 144 includes the subject matter of any one of Examples 136-143, and optionally, wherein the goodput parameter comprises a delivery ratio of the goodput packets.

Example 145 includes the subject matter of any one of Examples 136-144, and optionally, comprising means for determining a bit-rate adaptation coefficient based on the packet delay of the first transmitted packet, and determining the bit-rate based on the bit-rate adaptation coefficient and the bit-rate band.

Example 146 includes the subject matter of Example 145, and optionally, comprising means for selecting the bit-rate adaptation coefficient from a plurality of predefined bit-rate adaptation coefficients based on the packet delay of the first transmitted packet.

Example 147 includes the subject matter of any one of Examples 136-146, and optionally, wherein the plurality of transmitted packets comprises packets communicated over a wireless communication medium.

Example 148 includes the subject matter of any one of Examples 136-147, and optionally, wherein the plurality of transmitted packets comprises video data, and wherein the bit-rate comprises a bit-rate of the video data.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a packet selector to select at a first device a plurality of goodput packets from a plurality of received packets from a second device, said packet selector to select said plurality of goodput packets based on at least one selection parameter corresponding to said plurality of received packets;
   a band calculator to calculate a bit-rate band based on a dispersion of a goodput parameter corresponding to said plurality of goodput packets, said goodput parameter comprises a delivery ratio of said goodput packets; and
   a feedback module to provide a bit-rate adaptation feedback to said second device based on said bit-rate band.

2. The apparatus of claim 1, wherein said selection parameter depends on a network congestion between said second device and said first device.

3. The apparatus of claim 1, wherein said selection parameter comprises a delay parameter.

4. The apparatus of claim 3, wherein said packet selector is to select said plurality of goodput packets based on a comparison between packet delays of said plurality of received packets and a packet delay threshold.

5. The apparatus of claim 3, wherein said packet selector is to select said plurality of goodput packets based on a comparison between video frame delays corresponding to said plurality of received packets and a frame delay threshold.

6. The apparatus of claim 1, wherein said selection parameter comprises a quality parameter.

7. The apparatus of claim 1, wherein said band calculator is to calculate the bit-rate band based on a variance of said goodput parameter.

8. The apparatus of claim 1 comprising:
   a memory;
   a processor; and
   a wireless communication unit to receive said plurality of received packets.

9. The apparatus of claim 1, wherein said bit-rate adaptation feedback comprises an adapted bit-rate.

10. The apparatus of claim 9 comprising a bit-rate calculator to determine said adapted bit-rate based on a packet delay of a received packet and said bit-rate band.

11. The apparatus of claim 10, wherein said bit-rate calculator is to determine a bit-rate adaptation coefficient based on the packet delay of the received packet, and to determine the adapted bit-rate based on said bit-rate adaptation coefficient and said bit-rate band.

12. The apparatus of claim 11, wherein said bit-rate calculator is to select the bit-rate adaptation coefficient from a plurality of predefined bit-rate adaptation coefficients based on the packet delay of the received packet.

13. The apparatus of claim 1, wherein said bit-rate adaptation feedback comprises said bit-rate band.

14. The apparatus of claim 1, wherein said plurality of received packets comprises packets communicated over a wireless communication medium.

15. The apparatus of claim 1, wherein said plurality of received packets comprises video data, and wherein said bit-rate adaptation feedback indicates an adaptation of a bit-rate of said video data.

16. An apparatus comprising:
   a packet selector to select at a device a plurality of goodput packets from a plurality of transmitted packets from the device, said packet selector to select said plurality of goodput packets based on at least one selection parameter corresponding to said plurality of transmitted packets;
   a band calculator to calculate a bit-rate band based on a dispersion of a goodput parameter corresponding to said plurality of goodput packets, said goodput parameter comprises a delivery ratio of said goodput packets; and
   a bit-rate calculator to determine, based on said bit-rate band and a packet delay of a first transmitted packet, a bit-rate to be applied to a second transmitted packet subsequent to said first transmitted packet.

17. The apparatus of claim 16, wherein said bit-rate calculator is to determine a bit-rate adaptation coefficient based on the packet delay of the first transmitted packet, and to determine the bit-rate based on said bit-rate adaptation coefficient and said bit-rate band.

18. The apparatus of claim 16, wherein said selection parameter depends on a network congestion.

19. The apparatus of claim 16, wherein said band calculator is to calculate the bit-rate band based on a variance of said goodput parameter.

20. A product including a non-transitory storage medium having stored thereon instructions that, when executed by a machine, result in:
   receiving a plurality of received packets from a communication device;
   selecting a plurality of goodput packets from said plurality of received packets, based on at least one selection parameter corresponding to said plurality of received packets;
   calculating a bit-rate band based on a dispersion of a goodput parameter corresponding to said plurality of goodput packets, said goodput parameter comprises a delivery ratio of said goodput packets; and providing a bit-rate adaptation feedback to said communication device based on said bit-rate band.

21. The product of claim 20, wherein said bit-rate adaptation feedback comprises an adapted bit-rate.

22. The product of claim 20, wherein said instructions result in calculating the bit-rate band based on a variance of said goodput parameter.

23. A product including a non-transitory storage medium having stored thereon instructions that, when executed by a machine, result in:
   transmitting a plurality of transmitted packets;
   selecting a plurality of goodput packets from said plurality of transmitted packets, based on at least one selection parameter corresponding to said plurality of transmitted packets;
   calculating a bit-rate band based on a dispersion of a goodput parameter corresponding to said plurality of goodput packets, said goodput parameter comprises a delivery ratio of said goodput packets; and
   based on said bit-rate band and a packet delay of a first transmitted packet, applying a bit rate to a second transmitted packet subsequent to said first transmitted packet.

24. The product of claim 23, wherein said instructions result in determining a bit-rate adaptation coefficient based on the packet delay of the first transmitted packet, and determining the bit-rate based on said bit-rate adaptation coefficient and said bit-rate band.

* * * * *